United States Patent [19]

Krueger

[11] Patent Number: 5,330,819
[45] Date of Patent: Jul. 19, 1994

[54] PACKAGING MATERIAL

[75] Inventor: Bernd Krueger, Pohlheim, Fed. Rep. of Germany

[73] Assignee: Sued-Chemie AG, Munich, Fed. Rep. of Germany

[21] Appl. No.: 19,549

[22] Filed: Feb. 19, 1993

Related U.S. Application Data

[63] Continuation-in-part of Ser. No. 691,325, Apr. 25, 1991, abandoned.

[30] Foreign Application Priority Data

Apr. 26, 1990 [DE] Fed. Rep. of Germany ... 9004714[U]
Aug. 25, 1990 [DE] Fed. Rep. of Germany ... 9012268[U]

[51] Int. Cl.$^5$ .......................... B65D 81/12; B32B 3/00
[52] U.S. Cl. ..................................... 428/102; 428/402; 428/2; 206/584; 206/814; 493/967
[58] Field of Search ................. 428/2, 102, 76, 402; 206/584, 814; 493/967

[56] References Cited

U.S. PATENT DOCUMENTS 2,657,158 10/1953 Gerard ............................... 206/584
3,606,726 9/1971 Spertus et al. ..................... 493/967

FOREIGN PATENT DOCUMENTS 1793644 8/1959 Fed. Rep. of Germany.

Primary Examiner—Alexander S. Thomas
Attorney, Agent, or Firm—Flynn, Thiel, Boutell & Tanis

[57] ABSTRACT

A packaging material consisting of small pieces for filling the cavities in packaging containers. The packaging material consists of an outer cover, of a coarse-porous, air-permeable, thin paper, as for example a high-strength wrapping tissue, which surrounds a filling of waste paper or shredded paper (scraps) from paper shredding machines or the like. The ball-like packaging pieces of up to 10 cm in diameter are formed by folding or sealing. The filling does not have the tendency to crumble and all pieces are continuously reusable. Each packaging piece is very elastic due to its air-permeability and adapts well to the cavities to be filled.

9 Claims, 1 Drawing Sheet

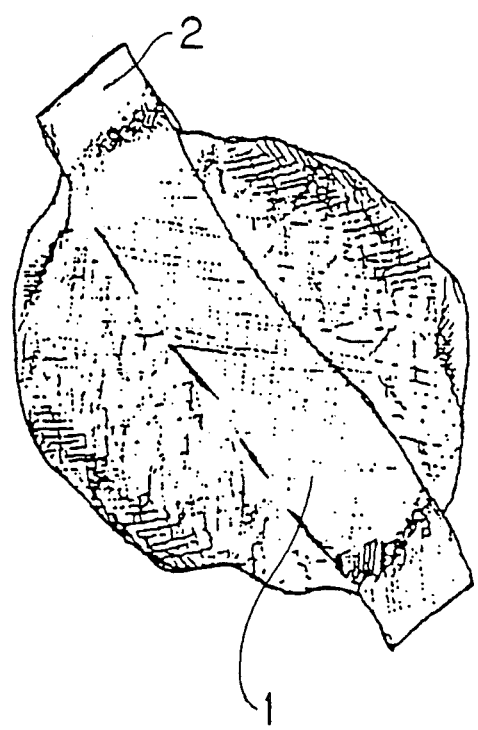

PACKAGING MATERIAL

This application is a continuation-in-part of U.S. application Ser. No. 07/691 325, filed Apr. 25, 1991 now abandoned.

FIELD OF THE INVENTION

The invention relates to a packaging material of small, similarly shaped, individual pieces for use in the filling of cavities in packaging containers in which articles are packaged, the contours of which pieces correspond only inexactly with the contours of the packaging containers, which articles, however, are still cushioned stationarily in the packaging containers.

BACKGROUND OF THE INVENTION

A packaging problem of this type exists relatively often in the packaging industry, in particular in the case of sensitive measuring instruments. Wood fiber used to be used extensively in this case. However, wood fiber is relatively expensive and crumbles during use so that it is not suited for every article to be packaged. Plastic, for example polyestyrol, has therefore, for a long time, very often been used in the place of wood fiber, which plastic is provided in large quantities of small pieces and is filled into the packaging cavities. If the individual plastic pieces are dimensioned advantageously, then a relatively loose and light structure is provided by these plastic pieces in the remaining cavities of the packaging containers, which structure, however, at the same time is capable of guaranteeing a stable positioning of the packaged article, if the packaging material is used correctly.

Unfortunately, such plastic parts are environmentally incompatible; they are not at all suited for disposal. Also, repeated use of such plastic pieces has up to now not been successful because the plastic pieces, when used again, are no longer sufficiently elastic and have permanent deformations in them which result in a substantially dense packaging of the plastic pieces. Further, the pieces, just like the wood fiber, have the tendency to crumble.

A method for the manufacture of a shock-absorbing packaging cushion is known from DE-C-38 39 225, which cushion consists of a natural, environmentally protecting disposable fill material and a cover material manufactured of a tear-resistant strip of paper. The strip of paper is thereby bent at lines extending parallel to one another to form a tube and the free, projecting end regions are connected flat with one another.

When straw or blade-like products are used as fill, in order to prevent these products from piercing through the cover material, and to avoid the danger of the cover tearing open and the fill material falling out of the cover, the blade-like products are shortened and are split open by crushing the length. The flatly connected end regions of the strip of paper are prior to their connection bent toward one another through further fold lines, are bent outwardly and fastened to the tubular cover, with the ends of the filled tube being sealed off.

The known packaging material is expensive, because here the blade-like products must first be pretreated, creating thereby due to the crushing a lot of dust particles, which are particularly disadvantageous for later use. Moreover, this known packaging requires an extremely tear-resistance paper, which has a negative effect on the shock-absorbing characteristic of the packaging material.

SUMMARY OF THE INVENTION

Therefore, the purpose of the invention is to provide a packaging material of the type discussed in greater detail below, which does not have these deficiencies, but can be used again and again, is environmentally friendly and is inexpensive without thereby losing the advantages which the up to now common fill materials enjoyed.

The purpose is attained according to the invention by utilizing shredded paper or paper shreds and enclosing it in an outer cover or envelope of a coarsely porous, air-permeable, thin paper, with the outer cover having advantageously a ball shape, shreds in the range of 8 to 12 mm long and 2 to 3 mm wide being best suited for use as waste paper. The outer cover consists advantageously of a heat-sealable high strength, thin wrapping tissue (or tissue paper); it can be folded or stitched, or even glued and should have a ball shape with a diameter approximately 1 to 10 cm or, with different geometrical shapes, have an approximately equally large volume.

The invention offers several advantages compared with the use of plastic or straw as packaging material. Thus, waste paper can mainly be utilized for the filling. The repeated use of the packaging material of the invention is relatively easily possible mainly because it has, on the one hand, sufficient elasticity to enable it to safely pack additional packages and, on the other hand, individual pieces can be comfortably removed when a package containing the individual pieces is opened up since they, in contrast to most comparable packaging materials, do not crumble. They can also be manufactured without any problems, comparable approximately to the manufacture of filled tubular bags.

BRIEF DESCRIPTION OF THE DRAWING

The single drawing FIGURE illustrates the inventive packaging material.

DETAILED DESCRIPTION

The single FIGURE of the drawing illustrates—slightly enlarged, one exemplary embodiment of the invention. It shows mainly the outer cover in a manufactured form, which consists of tissue paper formed into a three-dimensional shape, such as a ball and by a longitudinal fold 1 and a transverse fold 2.

The filled pieces, one of which is shown in the accompanying drawing, can be manufactured by a machine of the type shown in U.S. Pat. No. 3,256,673 and reference thereto is to be incorporated herein. The bags, when formed of the tissue paper, are filled with the waste paper and sealed shut. More specifically, the waste paper disclosed herein would be substituted for the fill material (charge of product) disclosed in the aforesaid patent.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A packaging material for dunnage purposes, comprising small-sized individual bodies of substantially identical shape to be introduced into hollows of packages or containers encompassing articles which are to be cushioned therein, each body including a filler comprising paper shreddings within an outer paper envelope, wherein each body is substantially ball-shaped with a diameter ranging between 1 cm and 10 cm, and wherein the paper envelope is air-permeable and is made of coarsely porous, heat-sealable, thin high-strength wrapping tissue.

2. The packaging material according to claim 1, wherein if the ball shape of each body is modified, the volume encompasses by the paper envelope still corresponds at least roughly to the respective ball volume.

3. The packaging material according to claim 1, wherein the paper shreddings are about 2 mm to 3 mm in width and about 8 mm to 12 mm in length.

4. The packaging material according to claim 1, wherein the paper envelope is folded and stitched.

5. The packaging material according to claim 1, wherein the paper envelope is folded and bonded.

6. The packaging material according to claim 1, wherein the paper envelope is stitched and bonded.

7. The packaging material according to claim 1, wherein the paper envelope is stitched.

8. The packaging material according to claim 1, wherein the paper envelope is bonded.

9. The packaging material according to claim 1, wherein the paper envelope is folded and stitched and bonded.

* * * * *